2,726,440
Patented Dec. 13, 1955

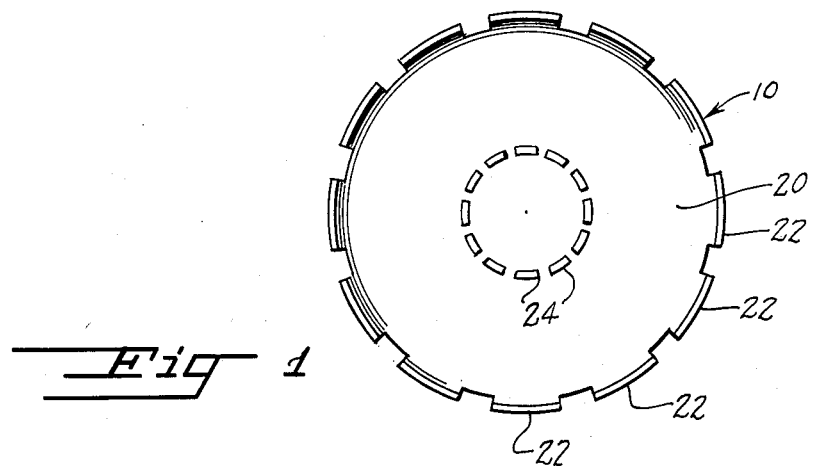
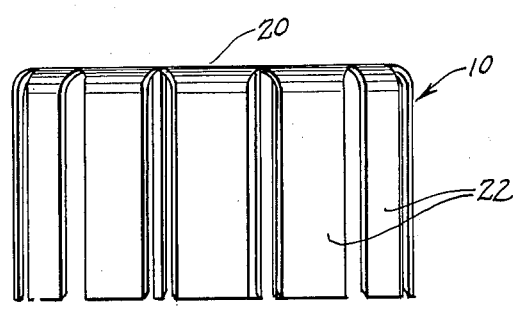
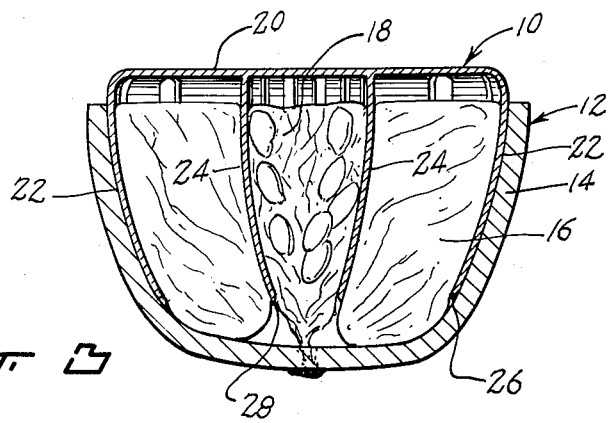

United States Patent Office

2,726,440

GRAPEFRUIT CUTTER

James B. Jowers, Brooklyn, N. Y.

Application February 11, 1955, Serial No. 487,586

3 Claims. (Cl. 30—24)

This invention relates to a device for cutting the pulp of a grapefruit into sections that may be more easily extracted from the rind, while at the same time separating the pulp from the core of the fruit.

The main object of the present invention is to provide a generally improved device of the type stated, which will be of simple construction, so as to facilitate its manufacture at low cost, but which will at the same time be increased in efficiency above prior grapefruit cutters previously in use.

Another object of importance is to form the cutter with an outer series of depending cutter blades and an inner series of cutter blades, the inner series being adapted to extend about and cut away the core of the fruit, and the outer series cooperating with the inner series to cut away the pulp from the rind, so that said pulp is separated both from the core and rind and can be readily extracted from the rind.

Another object of importance is to form the blades of the inner and outer series of a springable material, so that said blades will, as the cutter is moved downwardly into the fruit, be resiliently flexed conformably to the curvature of the grapefruit half into which the cutter is inserted, the device being thus readily adapted for use on grapefruit having different degrees of curvature.

Other objects will appear from the following description, the claims appended thereto, and from the annexed drawing, in which like reference characters designate like parts throughout the several views, in which:

Figure 1 is a bottom plan view of a grapefruit cutter formed according to the present invention;

Figure 2 is a side elevational view; and

Figure 3 is a sectional view taken diametrically through the cutter, as it appears when in use on a half of a grapefruit.

The reference numeral 10 has been generally applied to the cutter constituting the present invention. At 12 there has been generally designated a half section or portion of a grapefruit to be cut, said grapefruit portion including a rind 14, an edible pulp 16, and a core 18.

As shown in Figure 3, the cutter may be fabricated from any desired material having the required inherent qualities of flexibility such as spring metal, plastics, etc. The cutter comprises a flat, circular body 20, integrally formed with a circumferential series of outer, depending cutter blades 22. The cutter blades 22 are relatively wide, and are spaced short distances apart uniformly throughout the entire circumference of the device. In the illustrated, preferred embodiment, 12 such blades are provided, although the number of blades can of course be changed if desired.

Also depending from the circular body 20 is an inner series of elongated cutter blades 24. These are substantially coextensive in length with the blades of the outer series, and like the blades of the outer series, are formed from thin, flat, resilient material so as to permit them to be readily flexed resiliently when the cutter is inserted in the grapefruit in the manner shown in Figure 3.

At their lower ends, the several blades 22, 24 are formed with sharpened cutting edges 26, 28 respectively, to facilitate the insertion of the device fully into the grapefruit.

The blades 24 can of course be secured to the underside of the body 20 in any suitable manner, and if not formed integrally with the body, can be soldered thereto or otherwise fixedly attached.

It will be noted that the annular outer and inner series are concentric with one another and with the body 20, and in use of the device, the body 20 is grasped, and is positioned over the grapefruit substantially in concentric relation thereto.

Then, the body is forced downwardly into the grapefruit, and the outer series of cutter blades or prongs, as well as the inner series, will move substantially to the bottom of the grapefruit, being resiliently flexed inwardly by the changing curvature of the rind and pulp. If necessary, to cause the device to be inserted to its maximum extent, it can be rotated to a slight extent, and in this connection, it will be understood that the sides of the blades as well as the lower ends thereof can be sharpened.

When the device has been entered into the grapefruit to the maximum extent, the pulp will have been cut away from the rind, and further, will have been separated from the core 18. Therefore, when the device is removed, the pulp will be easily extractable from the rind.

The device would, of course, in a commercial embodiment be formed of some noncorrosive material such as stainless steel.

An important characteristic of the invention resides in the fact that the number of outer cutter blades is equal to the number of inner cutter blades. Further, the respective inner blades are aligned radially of the device with the corresponding outer blades, as shown in Figure 1. By reason of this arrangement, the inner and outer blades are, in effect, paired, and are adapted to be entered between the radially extending membranes or partitions of the grapefruit.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A grapefruit cutter comprising a flat, circular body; an outer series of cutter blades depending from said body, the blades of said outer series being spaced uniformly about the periphery of the body through the full circumference thereof; and an inner series of cutter blades depending from the body, the blades of the inner series being spaced a substantial distance inwardly from the outer series and being concentric with the outer series, the blades of said outer series being adapted to enter between the rind and pulp of a grapefruit, and the blades of the inner series being adapted to enter between the pulp and core of said grapefruit, the blades of the outer and inner series being formed of spring material so as to flex resiliently toward the center of the body responsive to movement of the body inwardly of the curving rind and core of the grapefruit.

2. A grapefruit cutter comprising a flat, circular body; an outer series of cutter blades depending from said body, the blades of said outer series being spaced uniformly about the periphery of the body through the full circumference thereof; and an inner series of cutter blades depending from the body, the blades of the inner series being spaced a substantial distance inwardly from the outer series and being concentric with the outer series, the blades of said outer series being adapted to enter between the rind and pulp of a grapefruit, and the blades of the inner series being adapted to enter between the pulp and core of said grapefruit, the blades of the outer and inner series being formed of spring material so as to flex resiliently toward the center of the body responsive to movement of the body inwardly of the curving rind and core of the grapefruit, the blades of both series being fixedly connected to the body and having sharpened cutting edges on their lower extremities.

3. A grapefruit cutter comprising a flat, circular body; an outer series of cutter blades depending from said body, the blades of said outer series being spaced uniformly about the periphery of the body through the full circumference thereof; and an inner series of cutter blades depending from the body, the blades of the inner series being spaced a substantial distance inwardly from the outer series and being concentric with the outer series, the blades of said outer series being adapted to enter between the rind and pulp of a grapefruit, and the blades of the inner series being adapted to enter between the pulp and core of said grapefruit, the blades of the outer and inner series being formed of spring material so as to flex resiliently toward the center of the body responsive to movement of the body inwardly of the curving rind and core of the grapefruit, the blades of both series being fixedly connected to the body and having sharpened cutting edges on their lower extremities, the blades of the outer series corresponding in number to the blades of the inner series, corresponding blades of the inner and outer series being aligned radially of the body with one another, the blades of the inner series being substantially narrower in width than the blades of the outer series.

References Cited in the file of this patent

UNITED STATES PATENTS 2,046,540     Anello     July 7, 1936